(12) United States Patent
Soler et al.

(10) Patent No.: US 12,088,159 B2
(45) Date of Patent: Sep. 10, 2024

(54) GENERATOR WITH LAP WINDINGS AND SEGMENTED PERMANENT MAGNETS

(71) Applicant: SAFRAN ELECTRICAL & POWER, Blagnac (FR)

(72) Inventors: José Soler, Buckinghamshire (GB); Nadhem Boubaker, Buckinghamshire (GB)

(73) Assignee: SAFRAN ELECTRICAL & POWER, Blagnac (FR)

( * ) Notice: Subject to any disclaimer, the term of this patent is extended or adjusted under 35 U.S.C. 154(b) by 525 days.

(21) Appl. No.: 17/291,762

(22) PCT Filed: Nov. 6, 2019

(86) PCT No.: PCT/EP2019/080373
§ 371 (c)(1),
(2) Date: May 6, 2021

(87) PCT Pub. No.: WO2020/094705
PCT Pub. Date: May 14, 2020

(65) Prior Publication Data
US 2021/0391777 A1   Dec. 16, 2021

(30) Foreign Application Priority Data

Nov. 9, 2018 (GB) ..................................... 1818327

(51) Int. Cl.
*H02K 21/04* (2006.01)
*H02K 1/17* (2006.01)
(Continued)

(52) U.S. Cl.
CPC ............... *H02K 21/04* (2013.01); *H02K 1/17* (2013.01); *H02K 1/27* (2013.01); *H02K 1/278* (2013.01);
(Continued)

(58) Field of Classification Search
CPC .......... H02K 21/04; H02K 21/48; H02K 1/17; H02K 1/27; H02K 1/278; H02K 3/28; H02K 3/42; B60L 50/10; B60L 2200/10
(Continued)

(56) References Cited

U.S. PATENT DOCUMENTS 3,235,762 A    2/1966  Brammerlo
3,408,517 A *  10/1968  Willyoung ............... H02K 3/28
                                                  310/198

(Continued)

FOREIGN PATENT DOCUMENTS

CN      102171449 A    8/2011
CN      102484401 A    5/2012
(Continued)

OTHER PUBLICATIONS

Great Britain Search Report, Application No. GB1818327.7, dated Apr. 17, 2019, 4 pages.
(Continued)

*Primary Examiner* — Michael Andrews
(74) *Attorney, Agent, or Firm* — RANKIN, HILL & CLARK LLP

(57) ABSTRACT

A generator arranged to be driven by an aircraft engine, the generator comprising a stator and a rotor. The stator comprises a stator core and a plurality of slots longitudinally extending in a direction of a longitudinal axis of the stator, for receiving conductors to form windings of the stator, and a plurality of power channels. Each power channel comprises a set of windings having at least a first phase winding including a first set of coils comprising a plurality of conductors wound in a lap winding configuration, the first set of coils having a split phase belt such that the first set of coils comprises at least a first coil and a second coil, the first coil being mechanically shifted with respect to the second
(Continued)

coil by a predetermined number of slots of the stator. The rotor comprises a permanent magnet adapted to reduce eddy-current losses.

17 Claims, 9 Drawing Sheets

(51) Int. Cl.
    *H02K 1/27*     (2022.01)
    *H02K 1/278*     (2022.01)
    *H02K 3/28*     (2006.01)
    *H02K 21/48*     (2006.01)
    *B60L 50/10*     (2019.01)

(52) U.S. Cl.
    CPC ............... *H02K 3/28* (2013.01); *H02K 21/48* (2013.01); *B60L 50/10* (2019.02); *B60L 2200/10* (2013.01)

(58) Field of Classification Search
    USPC .................................................. 310/180, 206
    See application file for complete search history.

(56) References Cited

U.S. PATENT DOCUMENTS

| | | | | |
|---|---|---|---|---|
| 2010/0133816 A1* | 6/2010 | Abolhassani | ............ | H02P 9/48 290/44 |
| 2014/0091673 A1* | 4/2014 | Anbarasu | ................ | H02K 3/48 310/216.109 |
| 2015/0145364 A1* | 5/2015 | Holcomb | ............... | H02K 53/00 74/DIG. 9 |
| 2015/0349598 A1 | 12/2015 | Gieras et al. | | |
| 2016/0020008 A1* | 1/2016 | Powell | .................... | H01F 7/021 310/156.01 |
| 2016/0047319 A1* | 2/2016 | Gieras | ..................... | F01D 15/10 60/788 |
| 2018/0026502 A1 | 1/2018 | Kawasaki et al. | | |
| 2019/0009917 A1 | 1/2019 | Anton et al. | | |

FOREIGN PATENT DOCUMENTS

| | | |
|---|---|---|
| CN | 205304440 U | 6/2016 |
| EP | 2477312 A1 | 7/2012 |
| GB | 736520 A | 9/1955 |
| GB | 2511574 A | 9/2014 |
| WO | 2004/113670 A2 | 12/2004 |
| WO | 2010/083904 A2 | 7/2010 |
| WO | 2012/059110 A2 | 5/2012 |
| WO | 2018/032617 A1 | 2/2018 |

OTHER PUBLICATIONS

International Search Report and Written Opinion, Application No. PCT/EP2019/080373. dated Mar. 2, 2020, 17 pages.
Saint-Michel, "Bobinage des machines tournantes à courant alternatif", published 2001, includes Summary in English, 25 pages.
Chinese Office Action Corresponding to CN 201980073537.1, dated Aug. 29, 2023, 6 pages.

* cited by examiner

Dual three phase machine – basic configuration.

GENERATOR WITH LAP WINDINGS AND SEGMENTED PERMANENT MAGNETS

The present invention relates to a permanent magnet generator arranged to be driven by an aircraft engine. In particular, the invention relates to a high speed permanent magnet generator that is fault tolerant.

BACKGROUND TO THE INVENTION

Aircraft propulsion systems typically comprise an engine, such as a turbine or jet engine, which may be connected to an electrical generator. The electrical generator is typically formed of an assembly of magnetic circuit components, comprising a rotor and a stator. As is well known, rotation of the rotor relative to the stator causes interaction of the magnetic field generated by the rotor with windings provided on the stator, generating an induced electromotive force (EMF) and/or electrical current. In a permanent magnet generator, the rotor's magnetic field is produced by permanent magnets, which induces an AC voltage in the stator windings as the stator windings pass through the moving magnetic field of the permanent magnet.

Many new aircraft technologies, such as hybrid and pure electrical aircraft, require high performance and low weight generators with both redundancy and fault-tolerant capability. However, unlike synchronous generators that use rotor windings to generate the rotor's magnetic field, a problem associated with permanent magnet generators is that the rotor flux is fixed and cannot be disabled. Consequently, a permanent magnet generator continues to generate a back EMF and supply any faults as long as the rotor is rotating. Therefore, a fault tolerant and redundant permanent magnet electric generator that is capable of high speeds, for example, more than 30000 rpm, is required to deliver the demanding requirements imposed by the latest developments of hybrid electric aircrafts.

Previous solutions to fault tolerance in permanent magnet generators have involved the use of non-overlapping concentrated windings around the teeth of the stator. However, such arrangements are limited by the fact that the electrical frequency is dictated by the number of poles. For aerospace applications, the use of concentrated windings results in a high pole number, typically of 10 or more, which results in a very high electrical frequency at high speeds. For example, a pole number of 10 would result in an electrical frequency of around 3.3 kHz at 40000 rpm. However, such frequencies are not manageable, or are at least very challenging, with current electronic control technologies, and such designs are therefore limited to uses that require speeds below 20000 rpm, in order to keep the electrical frequency and related losses within acceptable levels. As such, the solution provided by concentrated windings is not suitable for high speed generators.

One way of achieving high speeds at lower frequencies with a certain level of redundancy is to use overlapping windings with at least two power channels. In such cases, each phase belt is divided into two or more parts to form two or more sets of separate electrically isolated windings. In such an arrangement, there is an electrical shift between the power channels, for example, a 30° electric shift, 20° electric shift or 15° electric shift for 6 phases, 9 phases and 12 phases, respectively.

However, in such an arrangement, if the first set of windings is loaded and a short circuit happens on the second set of windings, then the first set of windings will experience a subsequent drop in voltage and power. For example, in a dual three phase winding with a 30 degree electric shift, a three phase short circuit in one set of windings can result in a voltage and power drop in the other set of windings by almost 50%. This is due to the magnetic coupling between the sets of winding. In other words, the two channels share the same magnetic path, which guides their flux. As such, standard distributed windings typically used for high speed generators do not provide fault tolerance.

Therefore, there is a need for a redundant and fault tolerant generator for use at high speeds.

SUMMARY OF THE INVENTION

To address the above noted problems, in particular the problem of magnetic coupling, a solution is proposed in which split distributed windings are used in the stator. These are also known as a lap winding with split phase belt configuration. As in standard distributed windings, each phase is split into two parts to form two sets of windings, that is, two power channels.

To provide this arrangement, each set of windings, that is, each power channel, comprises a number of sets of coils corresponding to the phases of the stator. Each set of coils is formed by conductors wound around the slots in a lap winding configuration whereby the phase belt is split up into at least two parts that are distributed around a portion of the circumference of the stator. Each phase comprises at least two coils that are wound around two sets of slots, wherein the two coils overlap in one region of slots, that is to say, the conductors of the two coils occupy the same slots. One coil of the phase is wound around a first set of slots in a first direction, for example, clockwise, whilst the other coil is wound around a second set of slots in a second opposite direction, for example, an anti-clockwise direction. As a result of this, the electric current flows along the conductors in the same direction in the overlapping region. Each set of slots comprises a number of slots that are divided into two separate sections of adjacent slots, each section being separated by a number of further slots that contain conductors corresponding to one or more other phases of the stator. For example, each set of slots may comprise eight slots that are divided into two sections of four adjacent slots, the sections of four adjacent slots are separated by a plurality of further slots disposed in between the two sections.

Furthermore, a number of the conductors in each of the two coils also overlap with the conductors of a different coil, specifically, a coil corresponding to a phase in a different power channel. That is to say, each phase comprises a number of conductors that each occupy the same slot as one other conductor corresponding to a phase of another power channel. This is called a double layer winding arrangement. Consequently, each set of windings, that is, each power channel, only physically extends partially around the circumference of the stator, wherein the conductors of each power channel overlap with the conductors of another power channel in two regions of slots around the circumference of the stator. That is to say, at least two regions of slots contain conductors corresponding to different sets of windings. As such, the magnetic core comprises at least two separate sets of overlapping windings that are mechanically shifted, for example, by 180° in the case of a 2 pair poles machine, with respect to one another, and hence there is no electric shift between the separate sets of windings. Consequently, the magnetic coupling between the power channels is considerably mitigated, and hence the power channels operate substantially independently of one another.

This arrangement therefore solves the problem of magnetic coupling between the separate sets of windings and results in a large reduction in the power loss of the healthy channel when a fault in the other channel occurs.

Whilst this winding arrangement solved the problem of magnetic coupling between the power channels, a large drop in the efficiency of the generator was still being experienced during fault conditions. Surprisingly, it was discovered that the eddy-current losses were increasing unexpectedly to an unacceptable level within the rotor magnets during a short circuit fault in one power channel. Such losses negatively affect the power in the healthy channel, resulting in as much as up to 60% power drop.

The large eddy-currents are due to the distortion of the magnetomotive force (MMF) waveform all along the airgap between the rotor magnet(s) and the stator when operating under a high unbalanced load, for example, when one channel has short-circuited and the other channel is operating under the rated power. Such a problem does not arise in non-fault tolerant electrical machines because they never operate under such conditions, that is to say, they do not provide multiple power channels that are capable of operating at normal power levels during a short-circuit fault in one of the power channels. As such, this particular phenomenon is specific to the topology proposed here with multiple independent power channels.

As such, when solving the problem of magnetic coupling, it is not obvious to predict that such an issue would arise during fault conditions.

To overcome this problem, the permanent magnets are specially adapted so as to minimise the induced losses under fault conditions. Specifically, special segmentation of the permanent magnets has been found to minimise the losses, for example, by laminating the permanent magnets in at least one direction. As such, the combination of split distributed windings and permanent magnets adapted to reduce eddy-current losses provides the solution of a high-speed and fault tolerant permanent magnet generator. In particular, as the power channels are magnetically decoupled, so that if a fault occurs in one channel, the other channel(s) will continue to deliver sufficient power, whilst the specially adapted permanent magnet of the rotor ensures that eddy-current losses are minimised during such faults. For example, in the case of a three phase short circuit fault in one channel, only an 8% power loss was experienced in the healthy channel during fault conditions.

A first aspect of the present invention provides a generator arranged to be driven by an aircraft engine, the generator comprising a stator, comprising a stator core having a substantially annular cross section and having a plurality of teeth and slots longitudinally extending in a direction of a longitudinal axis of the stator, the slots for receiving solid conductors to form windings of the stator, and a plurality of power channels, wherein each power channel comprises a set of windings having at least a first phase winding, the first phase winding comprising a first set of coils comprising a plurality of conductors wound in a lap winding configuration, the first set of coils having a split phase belt such that the first set of coils comprises at least a first coil and a second coil, the first coil being mechanically shifted with respect to the second coil by a predetermined number of slots of the stator. The generator further comprises a rotor, wherein the rotor comprises a permanent magnet adapted to reduce eddy-current losses.

As discussed above, the specific winding arrangement solves the problem of magnetic coupling under fault conditions, whilst the specially adapted rotor magnet solves the problem of high eddy-current losses that occur due to high unbalanced loads, for example, when one power channel has failed and the other channel is operating under the rated power. As such, the present invention provides a high speed generator that is fault and redundancy tolerant.

Preferably, the predetermined number of slots of the stator is defined by a size of the phase belt of the first phase winding. For example, if the phase belt of the first phase winding is 60°, in the absence of a split distributed winding arrangement, the phase belt may correspond to 8 slots of a 48 slot stator. When a split distributed winding arrangement as described herein is used, the first and second coils may be shifted 60° with respect to each other, that is, the two coils are each respectively shifted by 4 slots. This results in a phase belt of 4 slots.

The first coil may be wound around a first set of slots of the stator in a first direction, and the second coil may be wound around a second set of slots of the stator in a second opposite direction.

Preferably, the first set of slots of the stator and the second set of slots of the stator each comprise two respective groups of adjacent slots having a number of further slots disposed therebetween. That is to say, each set of slots is formed of two separate sections of adjacent slots that are separated by a certain number of other slots. For example, the first set of slots may comprise eight slots, divided into two respective groups of four adjacent slots, with eight further slots located between the two groups of four.

A group of adjacent slots in the first set of slots may overlap with a group of adjacent slots in the second set of slots in a first region of the stator core, wherein one or more conductors of the first coil occupy a same slot as one or more conductors of the second coil. That is to say, a group of adjacent slots in the first set of slots (i.e. of the first coil) may be the same slots as a group of adjacent slots in the second set of slots (i.e. of the second coil), such that both the first and second coils are wound such as to occupy this shared group of adjacent slots.

The first and second coils may be arranged such that an electric current travels along the conductors in the same direction in the first region.

A coil of at least one further set of coils corresponding to a further phase winding of one of the plurality of power channels may occupy one or more slots located within the first and/or second coils. That is to say, the further slots located within the first and second sets of slots may be occupied by other conductors corresponding to the other phases of the power channels.

Each of the two coils of the first set of coils may overlap with at least one further set of coils corresponding to a further phase winding of one of the plurality of power channels, wherein one or more conductors of the first set of coils occupy a same slot as one or more conductors of the at least one further set of coils.

Each of the plurality of power channels may comprise at least three phases.

Each of the plurality of power channels may then comprise the first phase winding, and further comprise a second phase winding comprising a second set of coils and a third phase winding comprising a third set of coils, the second and third sets of coils being wound in a lap winding configuration and having a split phase belt.

The stator may comprise two power channels having a diametrically opposite arrangement.

To reduce the eddy-current losses, the permanent magnet may be segmented in at least one direction. In this respect, the permanent magnet may be segmented in any suitable way so as to provide a plurality of individual magnetic segments that are separated by some non-magnetic material, for example, an air gap.

For example, the permanent magnet may comprises segments extending radially with respect to a direction of a rotational axis of the rotor.

Alternatively, or additionally, the permanent magnet may comprises segments extending longitudinally in a direction of the rotational axis of the rotor.

The segments may have a thickness of up to 2 mm, or preferably, a thickness of about 1 mm.

In some arrangements, the permanent magnet may be laminated.

A further aspect of the present invention provide an aircraft propulsion system comprising a generator as described above.

BRIEF DESCRIPTION OF THE DRAWINGS

Further features and advantages of the present invention will become apparent from the following description of embodiments thereof, presented by way of example only, and by reference to the drawings, wherein.

DETAILED DESCRIPTION OF PREFERRED EMBODIMENTS

Figure 1:
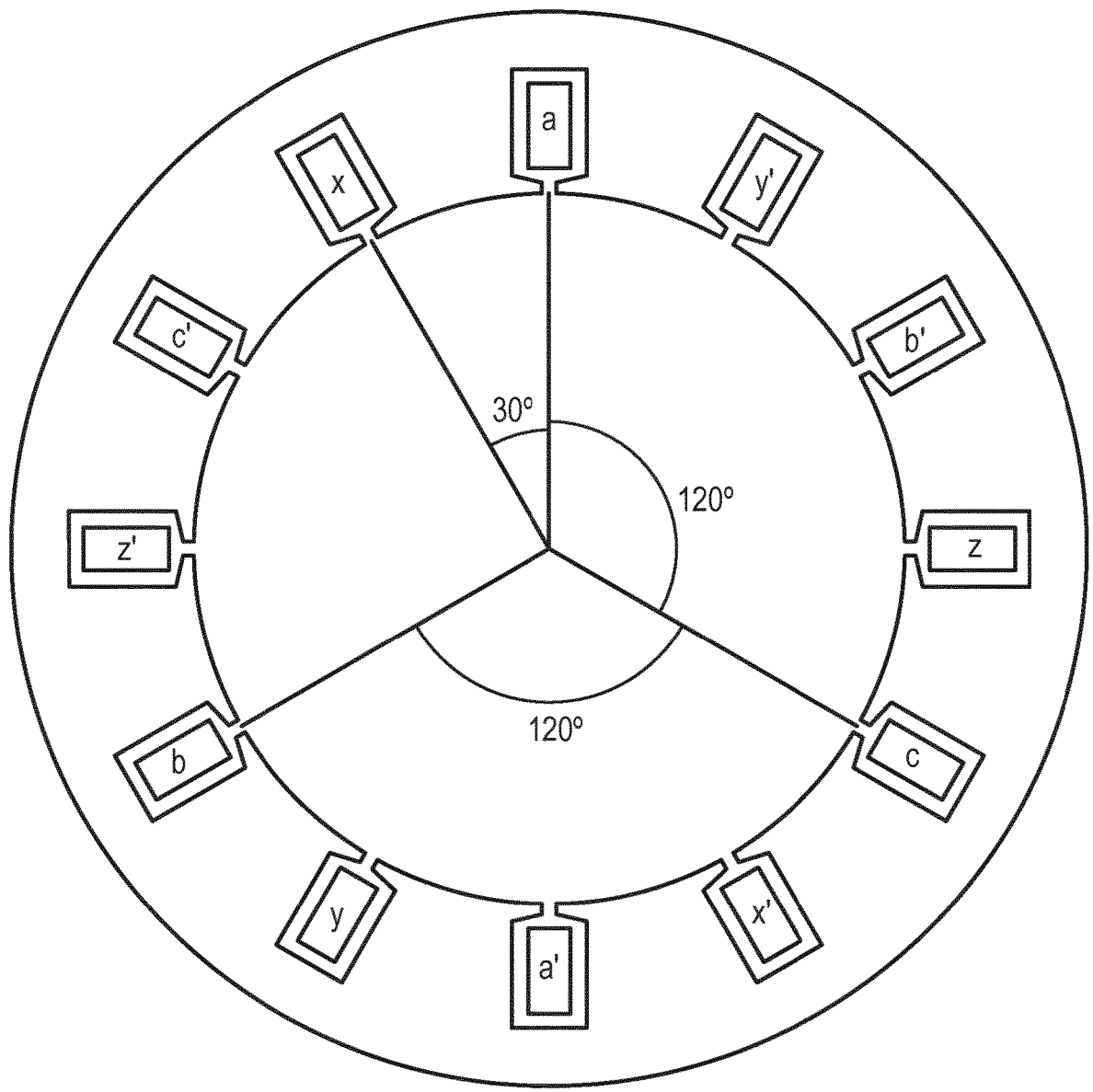
FIG. 1 illustrates a stator of the prior art having a dual three phase with 30° electric shift winding arrangement.

In order to achieve high speeds at lower electrical frequencies, one effective solution is to use at least two power channels, for example, by using two sets of windings with an electrical shift therebetween. An example of such an arrangement is shown in FIG. 1, which shows an example of a six phase machine with a 30 degree shift. Specifically, FIG. 1 shows a stator having a dual three phase arrangement with an electrical shift of 30°. The windings for each phase are split into two to provide two sets of electrically insulated windings, that is, two power channels, the first set of windings being denoted by a, b, c, a', b' and c', and the second set of windings being denoted by x, y, z, x', y' and z'.

However, such an arrangement is not fault tolerant. If the first set of windings is loaded and a short circuit happens on the second set of windings, the power drops in the 'healthy', i.e. fault-free, first set of windings, which in turn results in a drop in output voltage from this healthy first set of windings. This due to the magnetic coupling between the two sets of windings.

To address this problem of magnetic coupling, whilst still achieving the same high speeds at lower frequencies, a new arrangement is used in which the conductors in each of the power channels have a lap winding configuration with a split phase belt, also known as split distributed windings. In these arrangements, the magnetic coupling in the power channels is considerably lower, and hence operate independent of one another.

Figure 2:
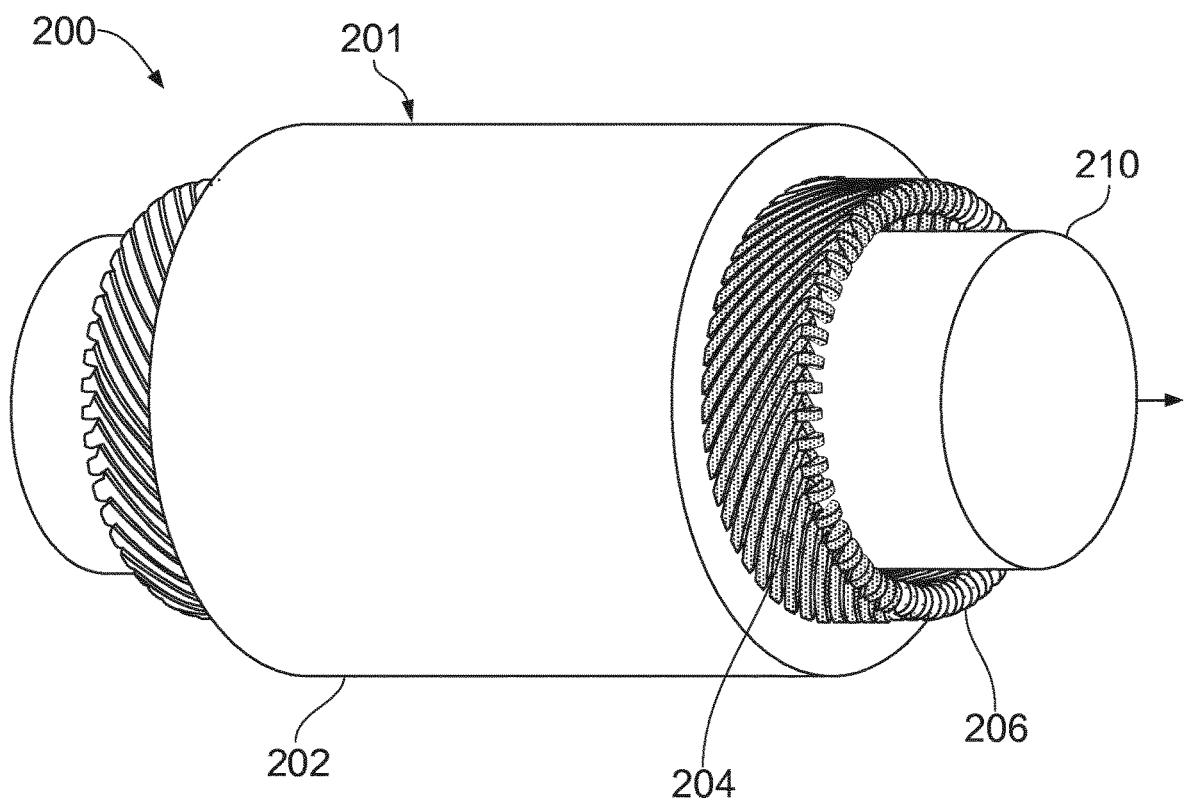
FIG. 2 illustrates an electrical machine according to the present invention.

FIGS. 2 to 5 illustrate an example of such an arrangement. FIG. 2 shows a generator 200 comprising a stator 201 and a rotor 210. The stator 201 comprises a magnetic stator core 202, and two power channels 204 and 206, each channel corresponding to a separate set of windings. Whilst this example shows two power channels 204 and 206, it will be appreciated that the stator 201 may include any suitable plurality of power channels as required by different practical implementations.

Figure 3:
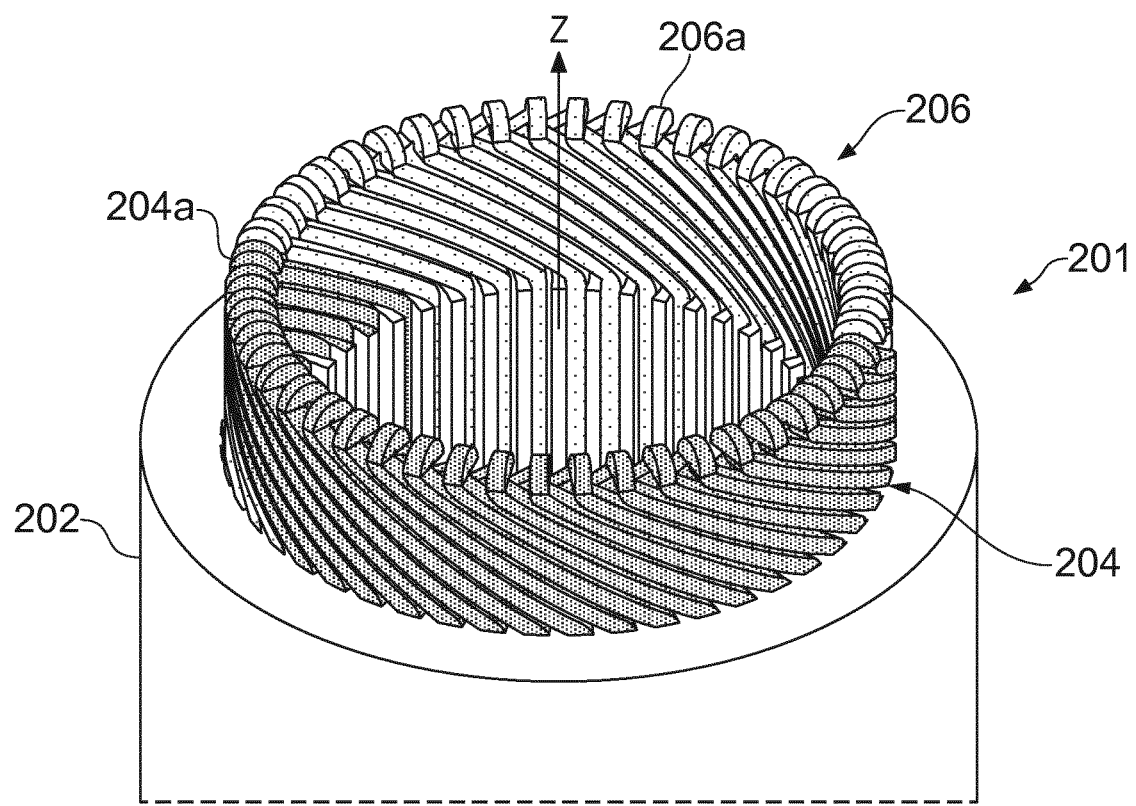
FIG. 3 is a three dimensional view of an end of a stator according to the present invention.
Figure 4A:
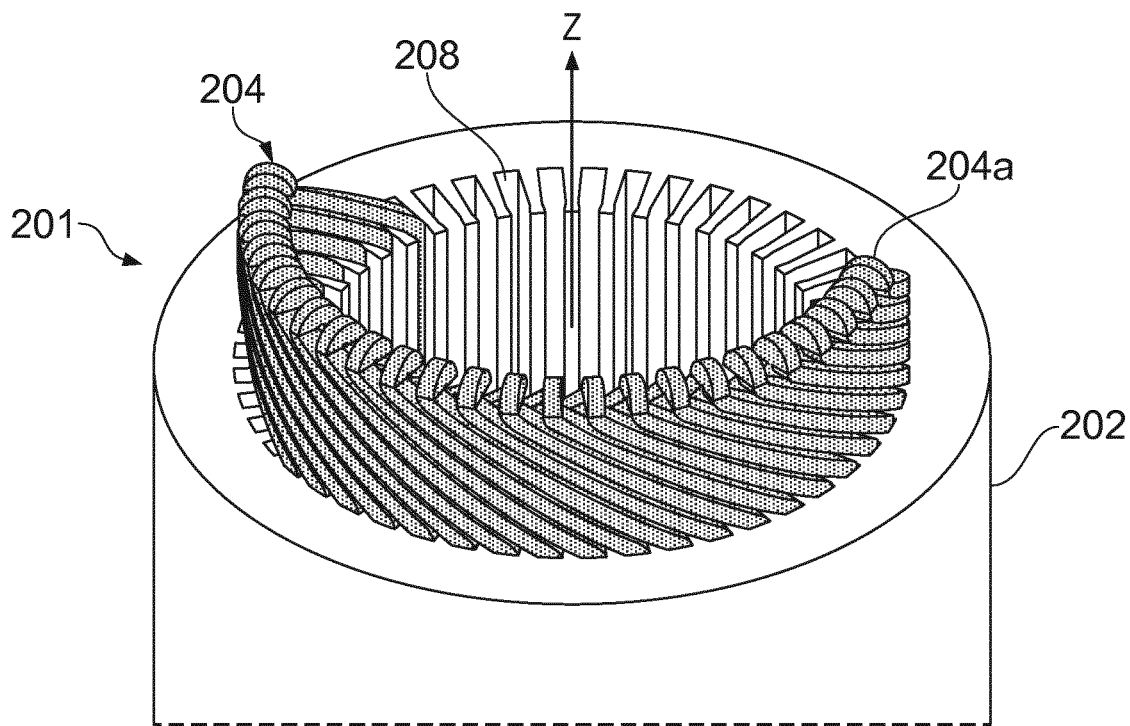
FIG. 4A illustrates a first part of the stator shown in FIG. 3.
Figure 4B:
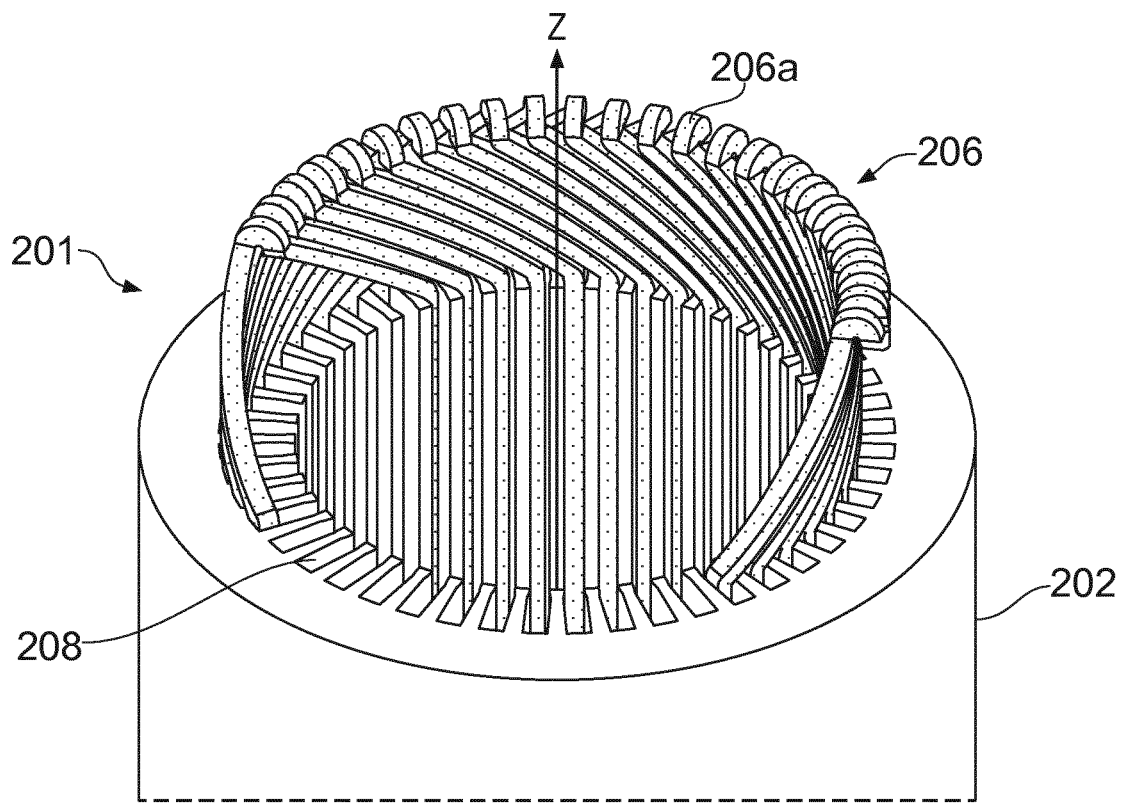
FIG. 4B illustrates a second part of the stator shown in FIG. 3.

As further illustrated in FIGS. 3, 4A and 4B, each power channel 204, 206 consists of solid conductors 204a, 206a that are wound around longitudinal slots 208 that extend through the stator core 202 in a direction of the longitudinal Z-axis of the stator 201. These conductors 204a, 206a make up the coils of each set of windings, as will be discussed in more detail below. In this respect, each of the slots 208 is configured such that it can house two solid conductors 204a, 206a, commonly referred to as a double layer winding configuration. Each of the power channels 204, 206 comprises at least three sets of coils (in a three phase machine) comprising a number of conductors 204a, 206a, wherein each set of coils corresponds to a phase of the stator 201. In this respect, each phase of the stator 201 is split into two, with each power channel 204, 206 comprising conductors 204a, 206a corresponding to that phase. The conductors 204a, 206a for each phase are then wound around the slots 208 in such a configuration that the phase belt is split into two further parts and distributed around part of the circumference of the stator core 202. This configuration will be described in more detail below.

Figure 5B:
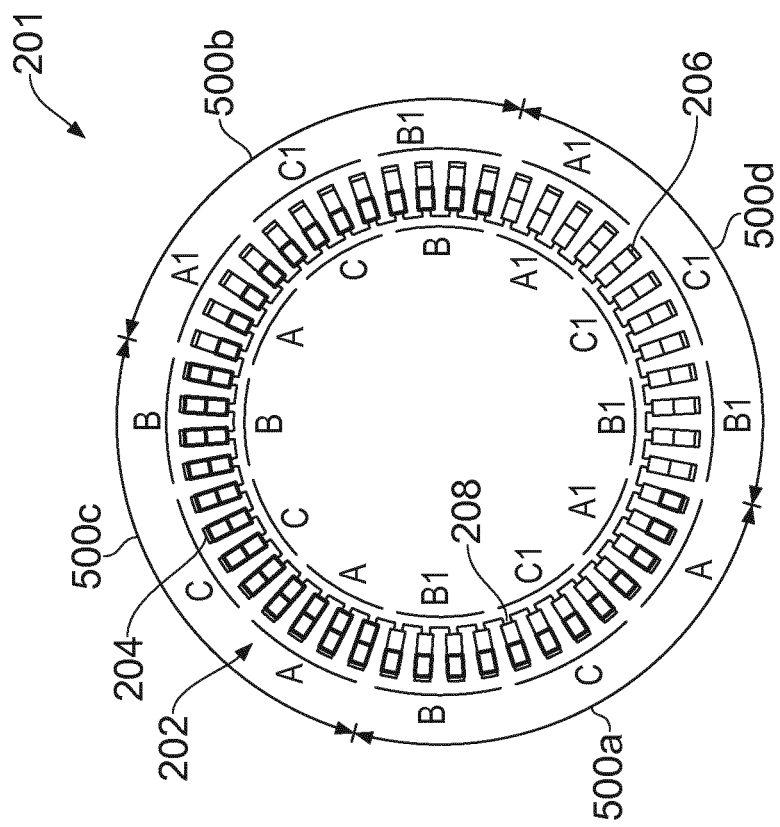
FIG. 5B is schematic illustrating the windings of a stator according to the present invention.
Figure 5A:
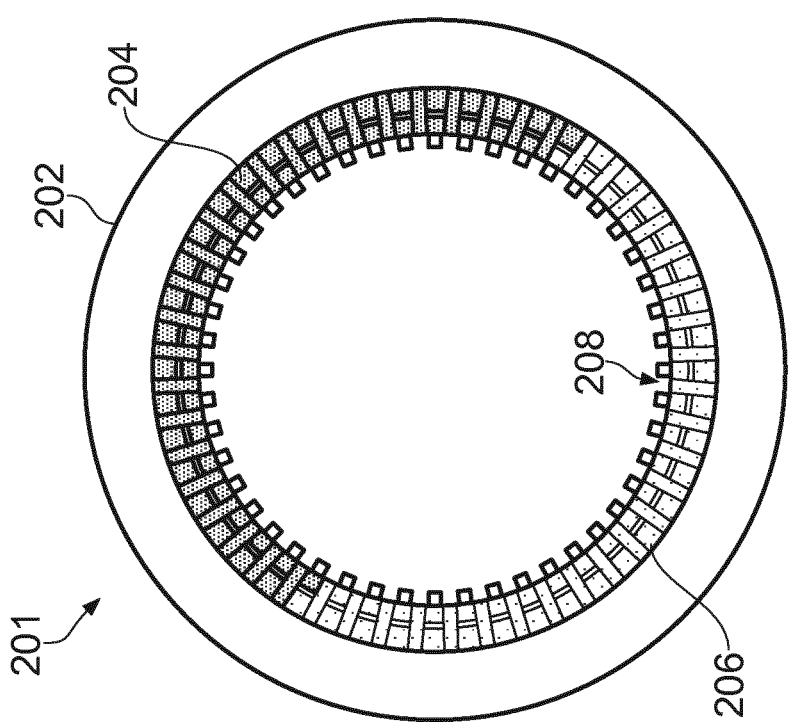
FIG. 5A is an end view of a stator according to the present invention.

As shown in FIGS. 3 and 4, the two power channels 204, 206 do not each fully extend around the entire circumference of the stator core 202. Instead, the two power channels 204, 206 each extend around only a portion of the circumference of the stator core 202. The power channels are positioned such that they are diametrically opposing and overlapping in two regions. This is further illustrated by FIGS. 5A and 5B, which show an end view of the stator 201. As can be seen in FIG. 5B, the two power channels 204, 206 extend around the circumference of the stator core 202 such that two regions of slots 208, denoted regions 500a and 500b house conductors from both power channels 204, 206. A third region of slots 208, denoted region 500c, then houses conductors from the first power channel 204 only, whilst a fourth diametrically opposing region of slots 208, denoted region 500d, houses conductors from the second power channel 206 only. In embodiments with different numbers of channels, different levels of overlap may be provided between adjacent channels, and the channels may be distributed substantially evenly around the circumference in different numbers.

In the example shown in FIG. 5B, each power channel 204, 206 comprises three phases, although examples with different numbers of phases per channel can be envisaged. The first power channel 204 comprises three sets of coils, each set of coils comprising multiple conductors providing phase windings A, B and C, whilst the second power channel 206 comprises three sets of coils, each set of coils comprising multiple conductors providing corresponding phase windings A1, B1, and C1. For each phase winding of each power channel 204, 206, the phase belt is split between three regions of slots 500a-d, wherein each region of slots 500a-d comprises a plurality of adjacent slots 208 that extend around a part of the circumference of the stator core 202. In this example, each region 500a-d comprises twelve slots 208. Each region 500a-d comprises conductors corresponding to each of the phases of the stator 201, wherein the conductors may be part of one or both of the first and second power channels 204, 206. That is to say, each group of adjacent slots 208 corresponds to one phase, and may comprise two conductors from the same phase winding, or conductors from the phase winding of two different power channels 204, 206. For each set of coils, a part of the phase belt is housed by one group of adjacent slots 208, which in this case is four adjacent slots 208. As such, the slots 208 within each region 500a-d are grouped according to the number of phases and the size of the phase belt, which in this case is three groups of four adjacent slots 208.

In each of the regions 500a and 500b, where the two power channels 204, 206 overlap, the conductors from each respective phase winding are housed by the same group of slots 208. For example, the respective conductors for phase winding A and phase winding A1 occupy the same group of adjacent slots 208, the respective conductors for phase winding B and phase winding B1 occupy the same group of adjacent slots 208, and the respective conductors for phase winding C and phase winding C1 occupy the same group of adjacent slots 208. In the third and fourth regions 500c, 500d, where only one power channel 204, 206 is present, the conductors for each phase of that power channel 204, 206 occupy one group of adjacent slots 208. For example, the conductors corresponding to phase winding A in the first power channel 204 occupy one group of adjacent slots 208 in region 500c, the conductors corresponding to phase winding B in the first power channel 204 occupy a second group of adjacent slots 208 in region 500c, and the conductors corresponding to phase winding C in the first power channel 204 occupy a third group of adjacent slots 208 in region 500c. Similarly, the conductors corresponding to phase winding A1 in the second power channel 206 occupy one group of adjacent slots 208 in region 500d, the conductors corresponding to phase winding B1 in the second power channel 206 occupy a second group of adjacent slots 208 in region 500d, and the conductors corresponding to phase winding C1 in the second power channel 206 occupy a third group of adjacent slots 208 in region 500d.

Figure 6:
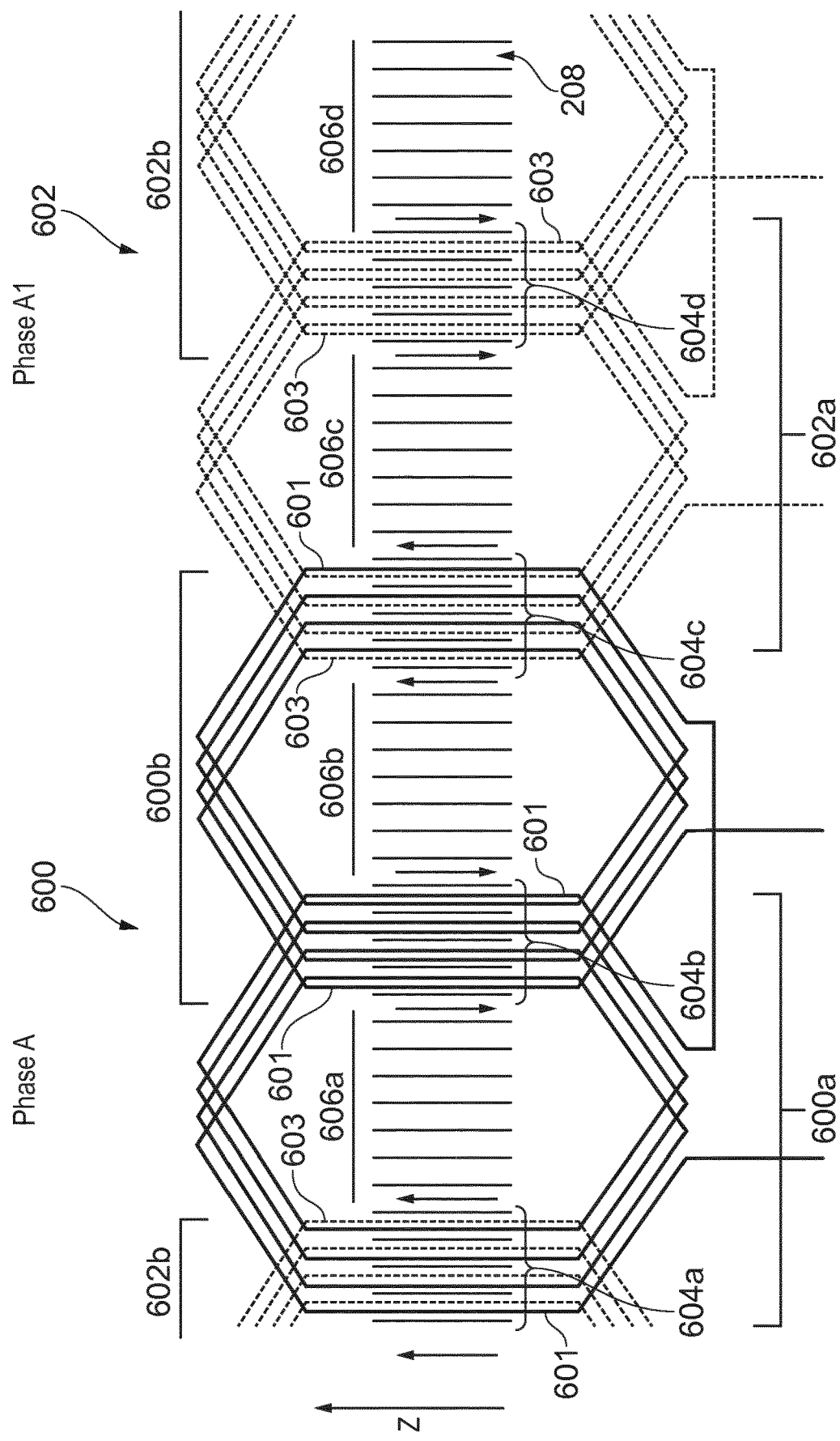
FIG. 6 is a schematic illustrating part of a winding configuration for a stator according to the present invention.

FIG. 6 further illustrates schematically how one or more sets of coils corresponding to a phase may be wound around the slots 208 of the stator core 202 to provide a lap winding with a split phase belt configuration. FIG. 6 shows two sets of coils 600, 602 that are wound on a stator core 202 comprising 48 individual slots 208, wherein each set of coils 600, 602 corresponds to one phase of the stator 201, each having a 60° electric phase belt. For example, with reference to FIG. 5B, the first set of coils 600 may provide phase winding A of the first power channel 204, whilst the second set of coils 602 may provide corresponding phase winding A1 of the second power channel 206. Each set of coils 600, 602 comprises multiple conductors 601, 603 that occupy the slots 208.

To split the phase belt, the first set of coils 600 is wound as two coils 600a, 600b, and the second set of coils 602 is also wound as two coils 602a, 602b. Taking the first set of coils 600 as an example, the first coil 600a is wound around a first set of slots comprising two separate groups of slots 604a, 604b spaced apart from one another. In this example, each group of slots 604a-d comprises four adjacent slots 208, however, it will be appreciated that this may be any number of slots 208 according to the size of the phase belt. The first coil 600a is wound around the two groups of slots 604a, 604b in a first direction, for example, in a clockwise direction, such that the conductors 601 of the first coil 600a are received by the first group of slots 604a in an upwards direction along the Z-axis and then subsequently received by the second group of slots 604b in a downwards direction along the Z-axis. The second coil 600b is then wound around another set of slots, also comprising two separate groups 604b, 604c spaced apart from one another. As such, the second group of slots 604b receives the conductors 601 of both coils 600a, 600b such that the two coils 600a, 600b overlap in one region. The second coil 600b is wound around these two groups of slots 604b, 604c in the opposite direction to that of the first coil 600a, for example, in an anti-clockwise direction, such that the conductors 601 of the second coil 600b are received by the slots in the second group 604b in a downwards direction along the Z-axis and then subsequently received in the third group of slots 604c in an upwards direction along the Z-axis. As such, the electrical current travels in the same direction in the second group of slots 604b comprising two conductors 601 of the first and second coil 600a, 600b.

The second set of coils 602 is configured in a similar way, with the first coil 602a being wound around the third group of slots 604c and a fourth group of slots 604d in a first direction, and the second coil 602b being wound around the fourth group of slots 604d and the first group of slots 604a in the opposite direction. As with the first set of coils 600, the two coils 602a, 602b of the second set of coils 602 overlap in one region, that being the fourth group of slots 604d, wherein two conductors 603 of the first and second coil 602a, 602b occupy the same slots such that the electrical current travels along the conductors 603 in the same direction.

In this example, the first coil 602a of the second set of coils 602 overlaps with the second coil 600b of the first set of coils 600, whilst the second coil 602b of the second set of coils 602 overlaps with the first coil 600a of the first set of coils 600, wherein the electrical current travels along the conductors 601, 603 in the same direction. As such, the sets of coils 600, 602 providing the same phase in each of the power channels 204, 206 overlap. In this example, where there are 2 pole pairs, phase winding A and phase winding A1 are mechanically shifted by 180°, and hence electrically shifted by 360°, and therefore the magnetic coupling between the two sets of coils 600, 602 is minimised. In other arrangements, for example, in a 3 pole pair machine comprising three power channels, the corresponding phase windings of each power channel are mechanically shifted by 120°, and hence electrically shifted by 360° to again minimise the magnetic coupling between the coils in each power channel. As such, the mechanical angle by which the power channels is shifted is calculated by the target electrical shift divided by the number of pole pairs. In order to minimise the magnetic coupling, the target electric shift will usually be 360 electrical degrees.

Whilst the groups of slots 606a-d between the sets of coils 600, 602 are shown in FIG. 6 as being empty for the purposes of clarity of the figure, it will be appreciated that in practice conductors corresponding to other phases will be arranged in a similar way so as to occupy these slots 606a-d.

This is exemplified in FIG. 5B, which illustrates how the conductors for each phase A, B and C of the first power channel 204 and the conductors for each phase A1, B1 and C1 of the second power channel 206 are distributed around the circumference of the stator core 202.

Figure 7:
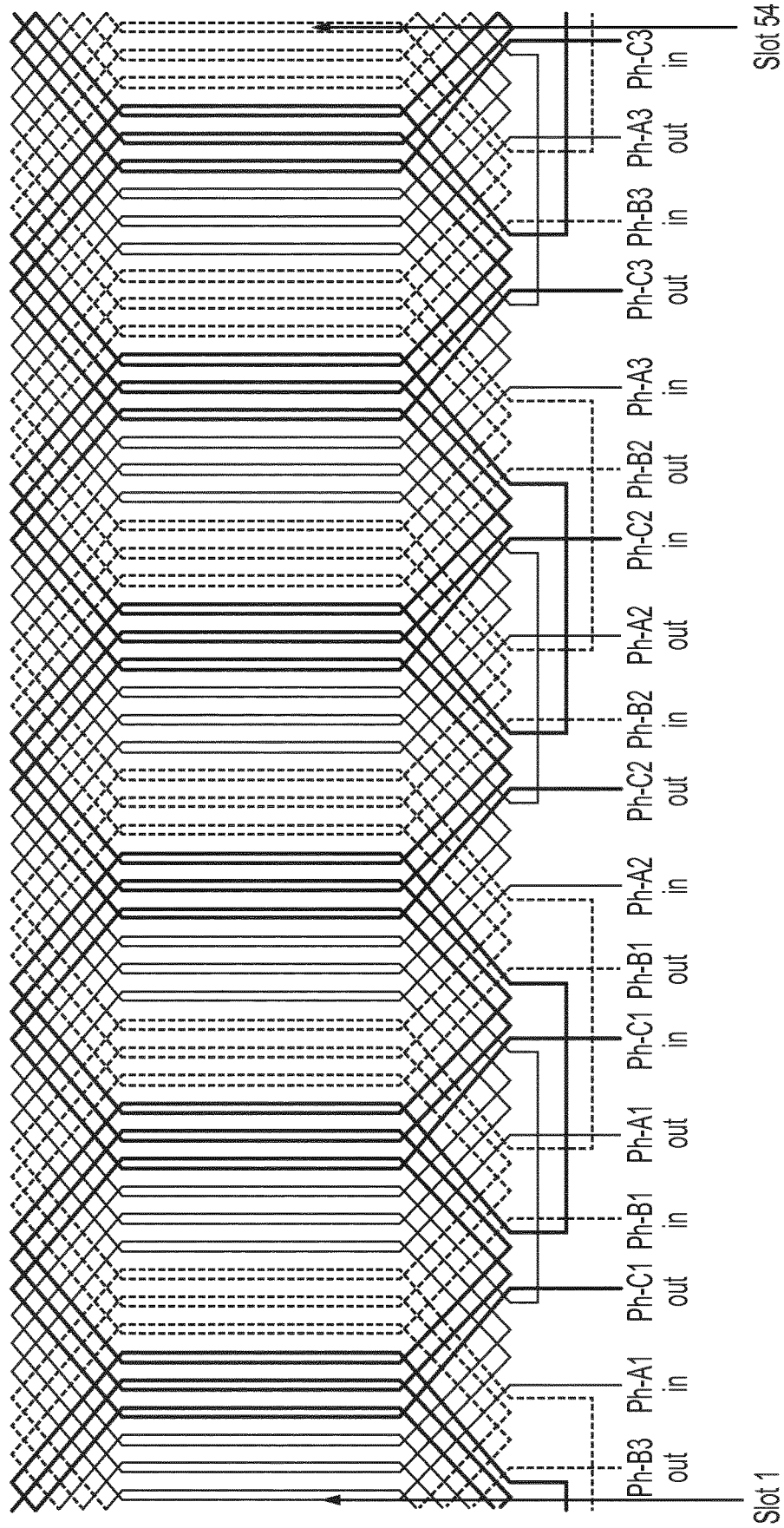
FIG. 7 illustrates a winding configuration of a further stator according to the present invention.

FIG. 7 provides a further example of a lap winding with split phase belt configuration. Specifically, FIG. 7 shows the conductor layout for a triple three phase configuration, wherein the stator comprises 54 slots and has three power channels, each having three phase windings (A1, B1, C1; A2, B2, C2; A3, B3, C3). As with the previous example, the sets of coils of each phase comprise two coils that are mechanically shifted with respect to one another, the coils of each phase overlapping with a coil of a another phase in the other two power channels. For example, one coil corresponding to phase winding A1 overlaps with one coil corresponding to phase winding A2, wherein the conductors of phases A1 and A2 occupy the same three adjacent slots, whilst another coil corresponding to phase winding A1 overlaps with one coil corresponding to phase winding A3, wherein the conductors of phases A1 and A3 occupy the same three adjacent slots.

The stator may comprise any suitable number of power channels, each comprising any suitable number of phase windings.

The stator winding arrangements described above solve the problem of magnetic coupling between the separate sets of windings and result in a large reduction in the power loss of the healthy channel when a fault in the other channel occurs. However, another problem that must be considered is the unacceptable increase in the eddy-current losses within the rotor magnets during a short circuit fault in one channel. The large eddy-currents are due to the distortion of the magnetomotive force (MMF) waveform all along the airgap between the rotor magnet(s) and the stator when operating under a high unbalanced load, for example, when one channel has short-circuited and the other channel is operating under the rated power. Such a problem does not arise in non-fault tolerant electrical machines because they never operate under such conditions, that is to say, they do not provide multiple power channels that are capable of operating at normal power levels during a short-circuit fault in one of the power channels. As such, this particular phenomenon is specific to the topology proposed here with multiple independent power channels. To overcome this problem, the permanent magnets are specially adapted so as to minimise the induced losses under fault conditions.

Figure 8:
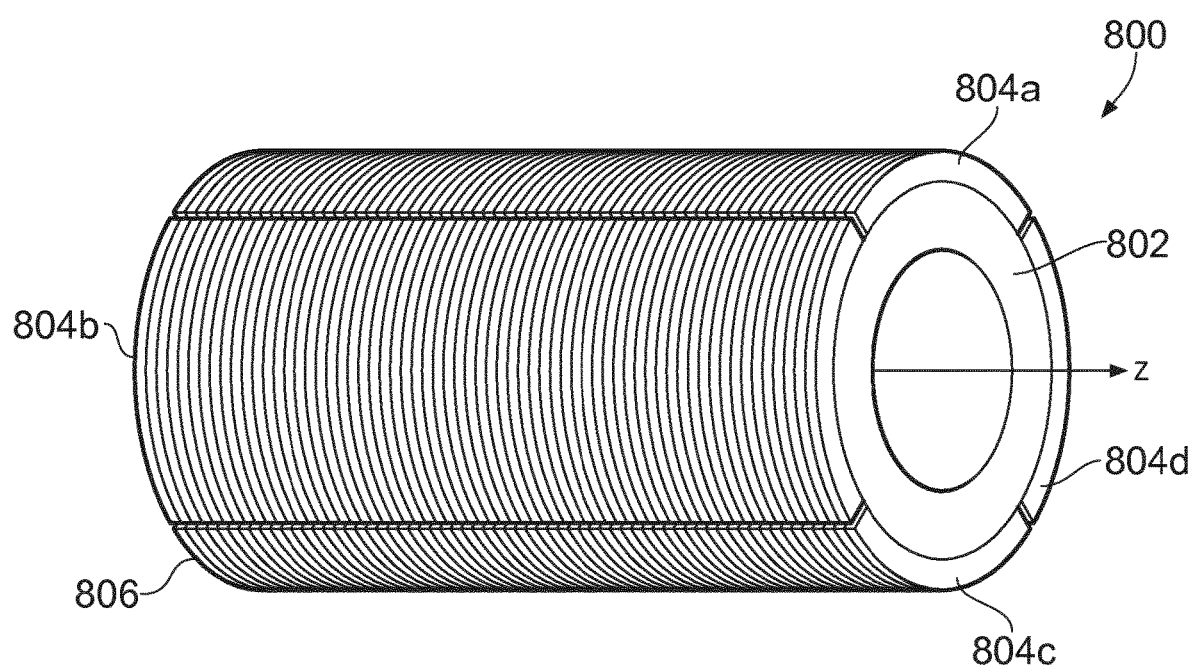
FIG. 8 illustrates a rotor magnet according to the present invention.

Specifically, the rotor magnets are segmented for example, by laminating the permanent magnets in at least one direction in order to break or disrupt the path of the eddy currents as they flow around the generator. Once segmented, the apparent electrical resistivity of the permanent magnets is higher than that of a solid magnet, and hence the laminated magnet more effectively opposes the induced eddy currents. FIG. 8 illustrates an example of rotor 800 that is specially adapted to reduce eddy-current losses during a circuit fault. The rotor 800 comprises a rotating component 802, preferably in the form of a ferromagnetic back iron, the rotating component 802 being surrounded by an array of two or more permanent magnets 804a-d that has/have been specially segmented. The array of two or more permanent magnets 804a-d comprises a plurality of segments 806 that may extend circumferentially or longitudinally. In this example, the magnets 804a-d have been laminated axially such that each segment 806 extends radially about the longitudinal Z-axis, that is, the axis of rotation. However, it will be appreciated that in other arrangements the magnets 804a-d may be laminated such that the segments extend longitudinally in the direction of the longitudinal Z-axis. In other arrangements, the magnets 804a-d may comprise a combination of radial and longitudinal segments.

The segments 806 may be of any suitable thickness for the desired electrical frequency, for example, for an electrical frequency of around 1.6 kHz, the thickness of each segment 806 may be up to 2 mm. Preferably, the segments 806 will be approximately 1 mm.

An alternative solution to the problem of eddy-current losses is to use a bonded magnet. For example, the magnet losses may comprise a plurality of elementary insulated sections, compressed and bonded together. Alternatively, a solid magnet body may be used that has slots cut into it in order to break the paths of the eddy currents. In this respect, any magnet configuration that has a formation which disrupts the path of the eddy currents may be suitable.

As such, the combination of a stator having a split lap winding configuration with split phase belt and a rotor with specially adapted magnets provides a solution to the problem of achieving fault tolerance for use at high speeds. As the power channels of the stator are decoupled, if a fault happens in one channel, the other channel(s) will continue to deliver sufficient power and without experiencing eddy-current losses in the rotor.

Figure 9:
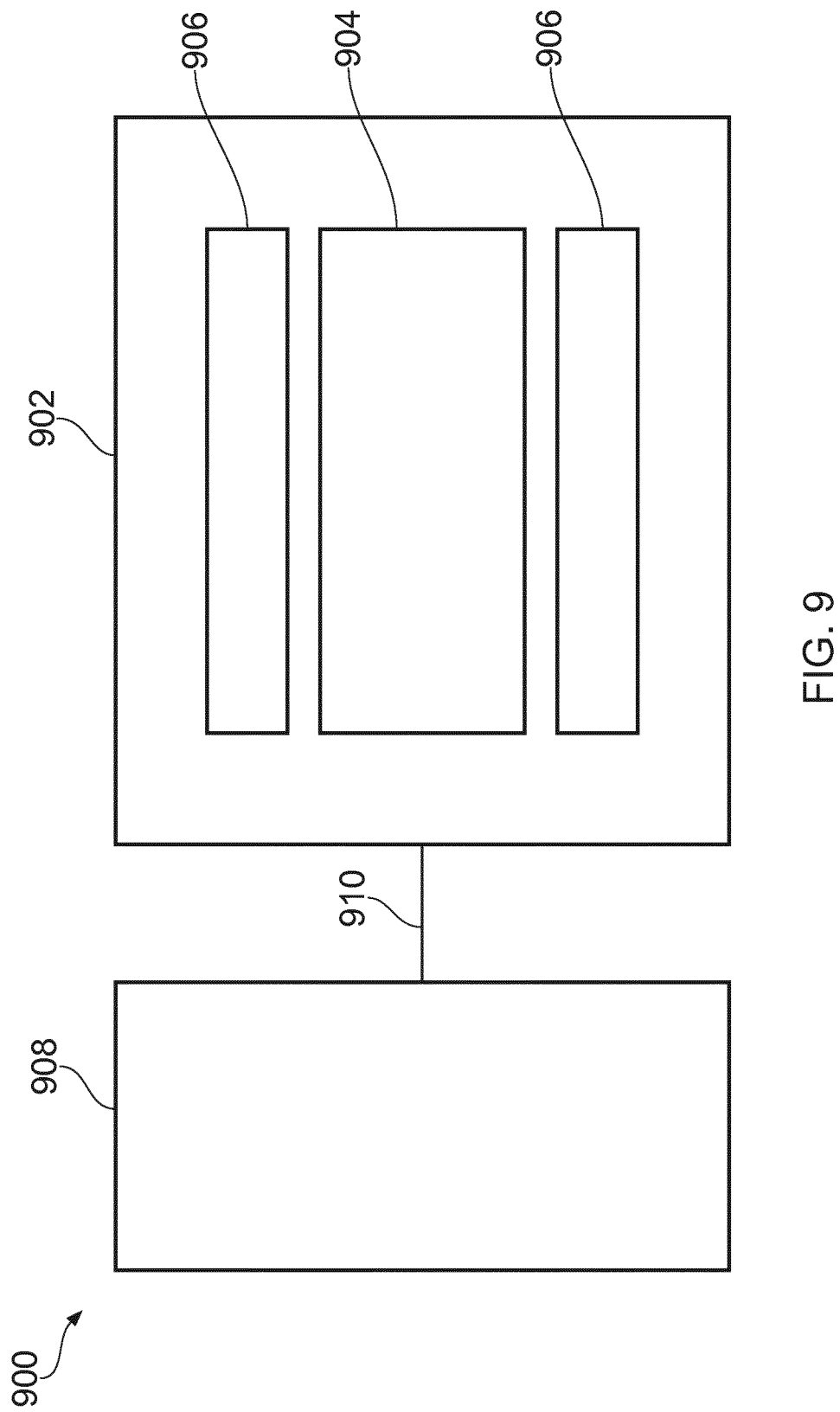
FIG. 9 is a schematic of an aircraft propulsion system comprising a generator according to the present invention.

FIG. 9 illustrates an example of an aircraft propulsion system 900 comprising a generator 902 according to the present invention. The generator 902 comprises a rotor 904 and a stator 906 according to the arrangements described above. In this respect, the rotor 904 has been specially adapted to reduce eddy current losses as described above, whilst the stator 906 has a split lap winding configuration with split phase belt according to any of the examples described herein. The generator 902 is connected to an aircraft engine 908 by means of a rotating shaft 910, wherein the engine 908 drives the shaft 910 to thereby drive the generator 902, the shaft 910 causing rotation of the rotor 904 to thereby generate an electrical current.

In the context of a hybrid aircraft, the generator described herein may be used in a propulsive system, wherein the generator is driven by a turboshaft to thereby give propulsive power to the aircraft to feed the electric motors driving the propellers of the aircraft.

Various modifications, whether by way of addition, deletion and/or substitution, may be made to all of the above described embodiments to provide further embodiments, any and/or all of which are intended to be encompassed by the appended claims.

The invention claimed is:

1. A generator arranged to be driven by an aircraft engine, the generator comprising:
   a stator, comprising:
      a stator core having a substantially annular cross section and having a plurality of slots longitudinally extending in a direction of a longitudinal axis of the stator, for receiving conductors to form windings of the stator;
      a plurality of power channels, wherein each power channel comprises a set of windings having a plurality of phase windings, each of the phase windings comprising a set of coils comprising a plurality of conductors wound in a lap winding configuration, the set of coils having a split phase belt such that the set of coils comprises at least a first coil and a second coil, the first coil being mechanically shifted with respect to the second coil by a predetermined number of slots of the stator, and wherein the set of windings of each power channel continuously extend around a portion of a circumference of the stator core, and are arranged such that the set of windings of each power channel are mechanically shifted with respect to the set of windings of an adjacent power channel; and a rotor, wherein the rotor comprises a permanent magnet segmented in at least one direction to thereby reduce eddy-current losses.

2. The generator according to claim 1, wherein the predetermined number of slots of the stator is defined by a size of the phase belt of each of the phase windings.

3. The generator according to claim 1, wherein the first coil is wound around a first set of slots of the stator in a first direction, and the second coil is wound around a second set of slots of the stator in a second opposite direction.

4. The generator according to claim 3, wherein the first set of slots of the stator and the second set of slots of the stator each comprise two respective groups of adjacent slots having a number of further slots disposed therebetween.

5. The generator according to claim 4, wherein a group of adjacent slots in the first set of slots overlap with a group of adjacent slots in the second set of slots in a first region of the stator core, wherein one or more conductors of the first coil occupy a same slot as one or more conductors of the second coil.

6. The generator according to claim 5, wherein the first and second coils are arranged such that an electric current travels along the conductors in the same direction in the first region.

7. The generator according to claim 1, wherein a coil of at least one further set of coils corresponding to a further phase winding of one of the plurality of power channels occupies one or more slots located within at least one of the first coil and the second coil.

8. The generator according to claim 1, wherein each of the two coils of the set of coils overlaps with at least one further set of coils corresponding to a further phase winding of one of the plurality of power channels, wherein one or more conductors of the first set of coils occupy a same slot as one or more conductors of the at least one further set of coils.

9. The generator according to claim 1, wherein each of the plurality of power channels comprises at least three phases.

10. The generator according to claim 1, wherein each of the plurality of power channels comprises a first phase winding comprising a first set of coils, a second phase winding comprising a second set of coils and a third phase winding comprising a third set of coils, the first set of coils, the second set of coils, and the third sets of coils being wound in the lap winding configuration and having a split phase belt.

11. The generator according to claim 1, wherein the stator comprises two power channels having a diametrically opposite arrangement.

12. The generator according to claim 1, wherein the permanent magnet comprises segments extending radially with respect to a direction of a rotational axis of the rotor.

13. The generator according to claim 12, wherein the segments have a thickness of up to 2 mm.

14. The generator according to claim 12, wherein the segments have a thickness of about 1 mm.

15. The generator according to claim 1, wherein the permanent magnet comprises segments extending longitudinally in a direction of the rotational axis of the rotor.

16. The generator according to claim 1, wherein the permanent magnet is laminated to thereby provide the segmented permanent magnet.

17. An aircraft propulsion system comprising a generator, wherein the generator comprises a stator core having a substantially annular cross section and having a plurality of slots longitudinally extending in a direction of a longitudinal axis of the stator, for receiving conductors to form windings of the stator;

a plurality of power channels, wherein each power channel comprises a set of windings having a plurality of phase windings, each of the phase windings comprising a set of coils comprising a plurality of conductors wound in a lap winding configuration, the set of coils having a split phase belt such that the set of coils comprises at least a first coil and a second coil, the first coil being mechanically shifted with respect to the second coil by a predetermined number of slots of the stator, and wherein the set of windings of each power channel continuously extend around a portion of a circumference of the stator core, and are arranged such that the set of windings of each power channel are mechanically shifted with respect to the set of windings of an adjacent power channel; and a rotor, wherein the rotor comprises a permanent magnet segmented in at least one direction to thereby reduce eddy-current losses.

* * * * *